3,549,218
END THRUST CONTROL DEVICE FOR A ROTATING SHAFT
Eugene C. Cagnon, Detroit, Kenneth P. Hurlin, Farmington, and Joseph Pavlovich, Ypsilanti, Mich., assignors to Ford Motor Company, Dearborn, Mich., a corporation of Delaware
Filed May 2, 1969, Ser. No. 821,196
Int. Cl. F16c 19/10, 19/32
U.S. Cl. 308—163                7 Claims

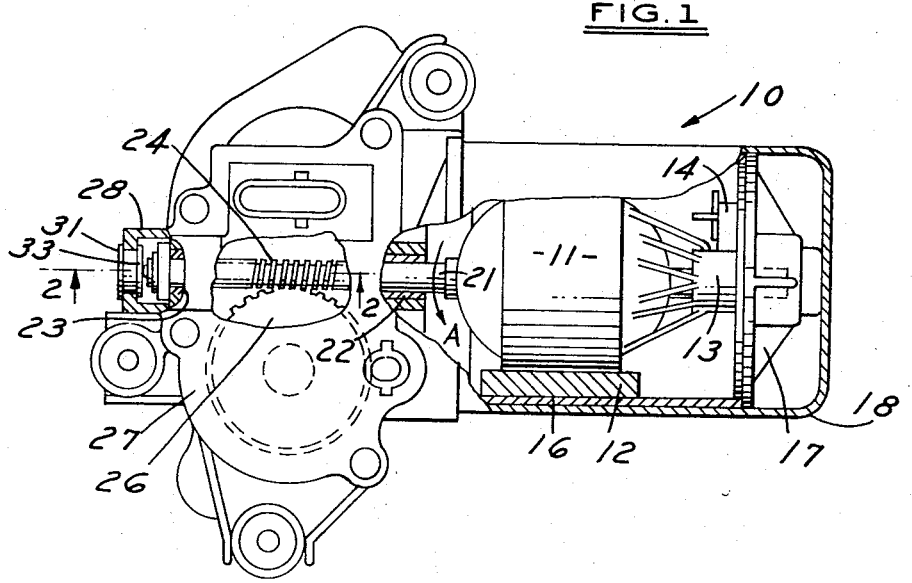
FIG.1
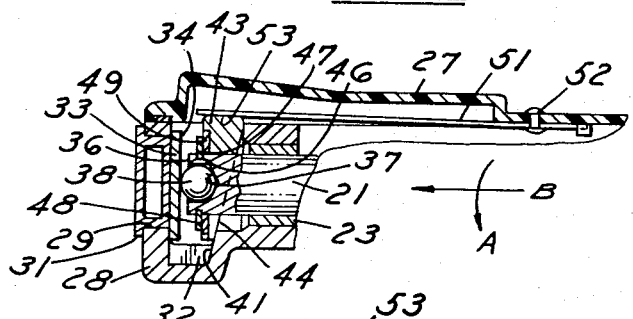
FIG.2
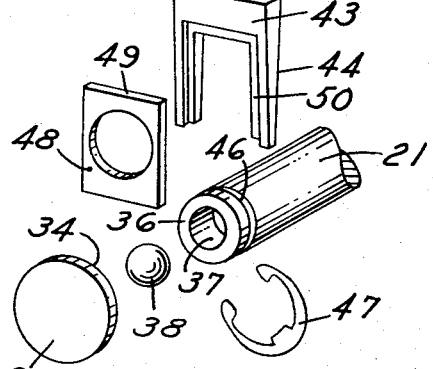
FIG.3
EUGENE C. CAGNON
KENNETH P. HURLIN
JOSEPH PAVLOVICH
INVENTORS
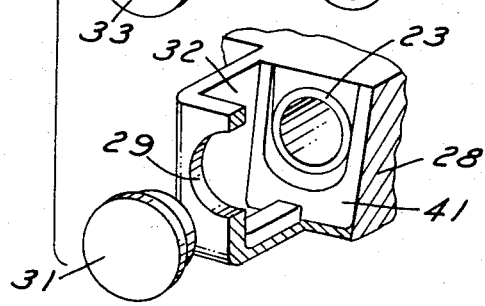
ATTORNEYS United States Patent Office 3,549,218
Patented Dec. 22, 1970

ABSTRACT OF THE DISCLOSURE

A device for controlling the movement of a shaft when a thrust load applied to the shaft is in a direction other than the direction of the normal thrust load on the shaft. The device employs a spring biased wedge which acts on the shaft to apply a force thereon in a direction identical to the normal thrust load applied to the shaft in an operating condition.

BACKGROUND OF THE INVENTION

During operation of electrical motors, a thrust load is applied to the shaft which acts as the supporting member for the motor's armature. The thrust load on this rotatiing shaft is in a particular direction during the normal operation of the motor. However, when the motor is reversed or when some external loads are transmitted to the armature shaft, the thrust load on the shaft is in a direction opposed to the normal thrust load direction. Such a change in direction of the thrust load causes a shifting of the shaft and the armature within the motor and results in inefficient and noisy operation of the motor. The shifting of the armature can also cause serious damage to the motor.

SUMMARY OF THE INVENTION

This invention is directed to an end thrust control device which stabilizes a rotating shaft of a device by positioning the shaft in a particular position and, thereafter, maintaining that position regardless of the direction of thrust load applied to the shaft.

In greater detail, the end thrust control device for a rotating shaft is mounted in a housing. The shaft normally rotates in a particular direction within the housing so that the thrust load thereon is in a particular direction along the axis of the shaft. The control device of this invention contains, essentially, the following components. A first surface is associated with the housing and is located at the end of the shaft toward which the normal thrust load is directed. A bearing device is supported by the end of the shaft adjacent this first surface for contacting the surface during rotation of the shaft. A second surface is associated with the housing and is inclined toward the axis of the shaft at an angle opposed to the direction of the normal thrust load. The second surface intercepts the shaft along its axis at a position spaced away from the first surface. A wedge device is provided which has a surface engageable with the second surface when the device is in a position at least partially encircling the shaft. A retainer is provided which is associated with the shaft for positioning and retaining the wedge device in association with the shaft and the second surface. A spring is also provided for engaging and biasing the wedge device in such a direction that the wedge acts between the retainer and the second surface to continuously force the shaft in the direction of the normal thrust load thereon. The bearing device supported by the shaft is constantly brought into contact with the first surface, and such contact is substantially maintained even though the thrust load on the shaft is momentarily opposite its normal direction.

BRIEF DESCRIPTION OF THE DRAWING

FIG. 1 is a plan view of an electrical motor structure employing the end thrust control device of this invention. FIG. 2 is a side elevation view taken along line 2—2 of FIG. 1, showing in greater detail the end thrust control device. FIG. 3 is an exploded, isometric view of the elements making up the end thrust control device shown in FIG. 2.

DESCRIPTION OF THE PREFERRED EMBODIMENT

Construction

In FIG. 1 there is shown an electrical motor structure generally designated by the numeral 10. This motor structure is of a type utilized for driving the windshield wiper system of an automobile. The motor includes an armature 11, pole pieces 12, commutator segments 13 and brushes 14. The pole pieces are secured to a shell 16, the shell being closed at its right end by an end cap 17 which is attached to the shell by a spring band 18.

In normal operation of the motor 10, the armature 11 is rotated in the direction of arrow A of FIGS. 1 and 2. Rotation of the armature in this direction causes a thrust load to be applied to the shaft 21 which supports and rotates with the armature. The shaft 21 is supported, as seen in FIG. 1, between a pair of spaced bearings 22 and 23. Between the two bearings, the shaft has a gear 24 formed thereon. The gear 24 meshes with a gear 26 which is operatively connected to the drive system of the windshield wiper system of the motor vehicle. A cover 27 overlies and encloses a housing 28 which supports the bearings and into which the shaft projects.

Now with reference to FIGS. 2 and 3, the end thrust control device of this invention will be explained in greater detail. The housing 28 is formed such that the left end thereof has an opening 29 therein. This opening is sealed by a cap member 31. The housing 28 supports within an open space 32 thereof a hardened plate 33. This plate presents a first surface 34, associated with the housing 28, within the space 32.

The shaft 21 is formed so that the left end 36 thereof has a recess 37 therein which receives a ball bearing 38. During normal operation of the rotating shaft 21 in the direction of arrow A of FIG. 2, the thrust load applied to the shaft 21 causes the ball bearing to be in contact with the first surface 34 formed on the plate 33.

The housing 28 also has associated therewith a second surface 41, best seen in FIG. 3. The second surface is inclined at an angle toward the axis of the shaft 21. The angle of the inclination is opposed to the direction of the normal thrust load on the shaft, which normal thrust load direction is indicated by the arrow designated B in FIG. 2. The second surface intercepts the shaft 21 at a position spaced along the axis of the shaft a distance from the first surface 34 formed on the plate 33.

A U-shaped wedge member 43 has a pair of depending legs which define a surface 44 for cooperating with the second surface 41 formed on the housing 28. The cooperation of the surface and the member is accomplished when the member is positioned so that the legs thereof encircle the shaft 21 as seen in FIG. 2. The U-shaped member may be formed of a material having some self-lubricating characteristics. Nylon, for example, would be such a suitable material.

The left end 36 of the shaft 21 also has an annular recess 46 therein as best seen in FIG. 3. A "C" shaped retainer ring 47 is received in the recess 46. When in its assembled position, the "C" ring has a surface thereon which engages a surface 48 on a non-rotating, metallic thrust washer 49 received in a recessed portion 50 of the wedge member. Thus, there is no rotating or moving surface acting against the wedge. The surface 48 is perpendicular to the axis of the shaft 21 when the wedge member 43 and thrust washer 49 are in their assembled positions as shown in FIG. 2. Through such a construction, the wedge member acts between the surface 41 formed on the housing 28 and the "C" ring.

A leaf spring 51, shown in FIG. 2, is attached to the cover 27 of the housing 28 by means of a small rivet 52. The free end of the leaf spring 51 acts on the top surface 53 of the cross arm of the U-shaped wedge member 43 in such a direction as to bias the wedge member downwardly as viewed in FIG. 2. The pressure applied by the spring 51 is a constant biasing force.

OPERATION

During the normal operation of the motor 10, the rotational direction of the shaft 21 is in the direction of arrow A of FIG. 2 and the thrust load on the shaft is in the direction of arrow B of FIG. 2. With the normal thrust load applied, the ball 38 is in engagement with the first surface 34 of the hardened plate 33 and the shaft 21 is properly located. When the shaft is so located, the armature 11 is properly positioned between the pole pieces 12 and the commutator segments 13 are properly associated with the brushes 14. When the direction of the motor 10 is reversed or when an outside load is delivered to the shaft 21 by reverse operation of the gear 26, the direction of thrust load on the shaft 21 will be changed momentarily to a direction opposed to the direction of arrow B of FIG. 2. This opposed thrust load will tend to shift the shaft and its associated armature which will then cause inefficient operation, and sometimes damage to the motor 10.

However, with the end thrust control device of this invention, whenever a load is applied to the shaft 21 in a direction opposed to the direction of arrow B of FIG. 2, the leaf spring 51 is effective to force the wedge member 43 downwardly as viewed in FIG. 2. Downward movement of the wedge member 43 and the thrust washer 49 supported thereby between the second surface 41 on the housing 28 and the "C" shaped retainer ring 47 secured to the shaft 21 biases the shaft 21 in the direction of the arrow B. This biasing action against the non-normal thrust load on the shaft 21 compensates for the non-normal thrust load and keeps the ball 38 in contact with the surface 34 of the plate 33 whereby the armature 11 is properly positioned in the motor 10.

What is claimed is:
1. An end thrust control device for a rotating shaft, the shaft being mounted in a housing and normally rotating in a particular direction therewithin so that the thrust of the shaft is normally in a particular direction along the length of the shaft, which device comprises,
  a first surface associated with the housing adjacent the end of the shaft towards which the normal thrust load of the shaft is directed;
  bearing means supported by the end of the shaft adjacent said first surface for contacting said first surface during rotation of said shaft;
  a second surface associated with the housing and inclined toward the axis of the shaft at an angle opposed to the direction of the normal thrust load on the shaft, said second surface intercepting the shaft at a position along the axis thereof spaced from said first surface,
  wedge means having a surface engageable with said second surface when said wedge means is in a position at least partly encircling the shaft,
  retainer means associated with the shaft for positioning and retaining said wedge means in association with the shaft and said second surface, and
  spring means both for engaging and for acting on said wedge means in such a manner that said wedge means acts between said retainer means and said second surface to force the shaft in the direction of the normal thrust load thereon whereby said bearing means is brought into contact with said first surface even though the thrust load in the shaft is opposite the normal direction.

2. The end thrust control device of claim 1 wherein said wedge means is a U-shaped member, wherein when in its assembled position said U-shaped member has the legs thereof positioned on opposite sides of the rotating shaft, and wherein said surface of said U-shaped member engaging said second surface associated with the housing is in part defined by surface areas on each of said legs of said member.

3. The end thrust control device of claim 2 wherein said retainer means is a "C" ring attachable to a recess formed about the circumference of the shaft, and wherein its assembled position said "C" ring engages a surface of said U-shaped member which is perpendicular to axis of the rotatable shaft.

4. The end thrust control device of claim 3 wherein said surface of said U-shaped member engaged by said "C" ring is a metallic surface formed by a member which is attached to said U-shaped member.

5. The end thrust control device of claim 4 wherein said spring is a leaf spring secured to the housing containing the rotating shaft, and wherein said spring engages the cross leg of said U-shaped member to bias said member in a direction toward the axis of rotation of the shaft.

6. The end thrust control device of claim 5 wherein said first surface is formed on a hardened metal plate supported within the housing, and wherein said second surface is formed as an integral part of the housing.

7. The end thrust control device of claim 6 wherein said bearing means is a hardened metal ball received within a recess formed in the end of the shaft adjacent said first surface formed on said hardened metal plate.

References Cited
UNITED STATES PATENTS 3,161,447   12/1964   Larsson _____ 308—163

FRED C. MATTERN, JR., Primary Examiner

U.S. Cl. X.R.
308—233